United States Patent [19]

Wrasidlo et al.

[11] Patent Number: 4,743,496
[45] Date of Patent: May 10, 1988

[54] SCREENS AND METHOD OF MAKING THE SAME

[75] Inventors: Wolfgang Wrasidlo, La Jolla; Frieder K. Hofmann, Oceanside, both of Calif.

[73] Assignee: Brunswick Corporation, San Diego, Calif.

[21] Appl. No.: 814,301

[22] Filed: Dec. 30, 1985

[51] Int. Cl.$^4$ ............................................. B32B 7/00
[52] U.S. Cl. .................................... 428/254; 156/155; 156/305; 156/304.6; 427/307; 428/253; 428/255; 428/265; 428/267
[58] Field of Search ............... 428/245, 254, 262, 265, 428/260, 253, 255, 267; 427/140, 307; 156/155, 305, 309.6

[56] References Cited

U.S. PATENT DOCUMENTS 4,340,558  7/1982  Hendrickson ..................... 428/255

Primary Examiner—James J. Bell

[57] ABSTRACT

A fabric of a polymer material useful for filtration and other purposes can be treated with a mixture of a solvent for the polymer material in a liquid which is not a solvent for the polymer material and which is more volatile than the solvent for a time and at a temperature sufficient to dissolve some polymer material in the strands. As this occurs the surface tension of the dissolved polymer will cause the dissolved polymer to move to create a continuous, smooth walled, curved surface connecting adjacent strands and extending between such strands.

23 Claims, 1 Drawing Sheet

SCREENS AND METHOD OF MAKING THE SAME

BACKGROUND OF THE INVENTION

The invention set forth in this specification pertains to new and improved screens such as are commonly utilized for filtration purposes but which are also capable of being utilized in other applications. The invention also pertains to a method of manufacturing such screens.

Screens which are primarily useful as filters have conventionally been manufactured by weaving strands of material into a fabric in which the strands are spaced from one another to a sufficient extent so as to define openings between adjacent strands. On occasion screens useful as filters have been manufactured by knitting one or more strands of material into a knitted fabric in which openings are defined by the positions of the strands relative to the looped or knitted connections between adjacent strands. As polymer technology has advanced it has been increasingly common to form such filter (and other) fabrics out of polymer materials. Although polymer filters consisting of either a knitted or woven fabric are quite utilitarian and widely used in many applications it is considered that these fabrics are not as satisfactory as one might reasonably desire for filtration purposes because of either or both of two different problems.

One of these problems concerns the fact that the individual strands which overlie one another in a woven fabric are, unless the strands are bonded to one another, capable of shifting somewhat relative to one another. If this should occur there would be a change in the size of the openings adjacent to the location where any movement occurred. It is considered that such movement of overlying strands may also be present in connection with knitted fabric filters to a lesser degree than such movement is encountered in connection with woven filters.

Another of these problems concerns the fact that both knitted and woven filter media are of such a character that there is a reasonable chance of the material unnecessarily accumulating on them during their use because of the fact that the strands within them overlie one another so as to create regions where particles may be more or less permanently trapped. Also some material may be more or less permanently attached to the strands because their walls are not continuous and smooth. While in some applications such accumulations along strands or generally at fiber junctions is capable if being beneficial, in others it is considered to be detrimental.

The two problems discussed in the preceding have previously been recognized. As a result of this recognition it has been proposed to bond adjacent, overlying strands of a filter fabric together utilizing either a conventional adhesive or by creating a bond through the use of heat such as can be developed by the application of an ultrasonic horn. These procedures are considered to have their drawbacks. In the former there is always a chance that the adhesive may not adequately connect the overlying strands or may be disadvantageous because it possesses physical properties different from those of the fiber strands. The use of ultrasonic or other heat-type bonding means may be disadvantageous because of the problems of being able to achieve effective bonds and because of the nature of the distortion which is apt to be encountered as a result of the application of heat to at least the surface of a polymer strand. Also expedients of the types indicated are not commonly considered to provide fabric in which the overlying adjacent strands are joined by continuous, smooth surfaces extending generally between and connecting such adjacent strands.

Another problem has been encountered in connection with the use of woven screens for size separation purposes. Because the openings in such screens are normally square the size separation achieved with such screens is not as accurate as may be desired. This is because the distance between the sides of such openings is less than the diagonal distance between the corners of such openings. As a consequence of this there is a tendency for particles which are of less length than such a diagonal distance but longer than the corresponding distance between the sides to either be retained on such screens or to pass them in accordance with how they are oriented as they each such screens or how they may be oriented as a result of movement at the surfaces of such screens.

BRIEF SUMMARY OF THE INVENTION

As a result of these considerations it is believed that there is a need for new and improved filter fabrics in which the adjacent, overlying strands of material are bonded together so as to be connected by continuous, smooth surfaces extending generally between adjacent strands. A broad objective of the present invention is to provide fabrics useful for filtration purposes in order to fulfill or satisfy this need. The invention is also intended to provide desirable fabrics as herein indicated which are relatively inexpensive, which are capable of being used for prolonged periods for different purposes and which are of such a character that it is difficult if not impossible for material to become more or less permanently trapped along the surfaces of at least the junctions of the "strands" in such fabrics.

A related objective of the present invention is to provide fabrics as noted which are not only useful for filtration purposes but which can be employed as screens in diverse applications. It is considered that the screens of this invention are useful in traditional filters and flow systems for separating materials according to size and in various different types of bioreactors in which cellular material is grown on the strands of the fabric as a solution is circulated relative to the fabric. Normally such flow will be through the fabric.

The various objectives of the invention pertaining to a fabric are achieved in accordance with this invention by providing a piece of fabric having overlying strands of at least one polymer material located so as to define openings located between said strands and having said strands bonded together in which the improvement comprises: said strands being integral with one another as the result of polymer material extending between said strands and connecting said strands, the walls of said polymer material surrounding and adjacent to said openings and extending between and connecting said strands being continuous, smooth and curved in configuration. Normally the internal orientation of the strands will be different from that of the material extending between and connecting the strands.

The invention is also intended to provide a process for producing fabrics having utilities as are indicated in the preceding discussion which may be easily and conveniently produced at a nominal cost. These latter objectives are achieved in accordance with this invention by providing a process in which overlying strands of material in a fabric are treated so as to be bonded together in which the improvement comprises: the strands being strands of at least one polymer which is soluble in a solvent, said strands are treated by applying a mixture of a solvent for the polymer in another liquid which is not a solvent for the polymer and which is more volatile than said solvent to the strands and then drying said strands, the time when said strands are in contact with said mixture and the temperature of said mixture together with the drying time and temperature being sufficient to dissolve polymer material within the strands to a sufficient extent so that the surface tension of the resulting solution will cause this dissolved polymer to flow to create a continuous, smooth walled, curved surface connecting adjacent strands of material and extending between such strands.

BRIEF DESCRIPTION OF THE DRAWING

Because of the nature of this invention it is considered that it is best to discuss it further by first referring to the accompanying drawing in which.

Figure 1:
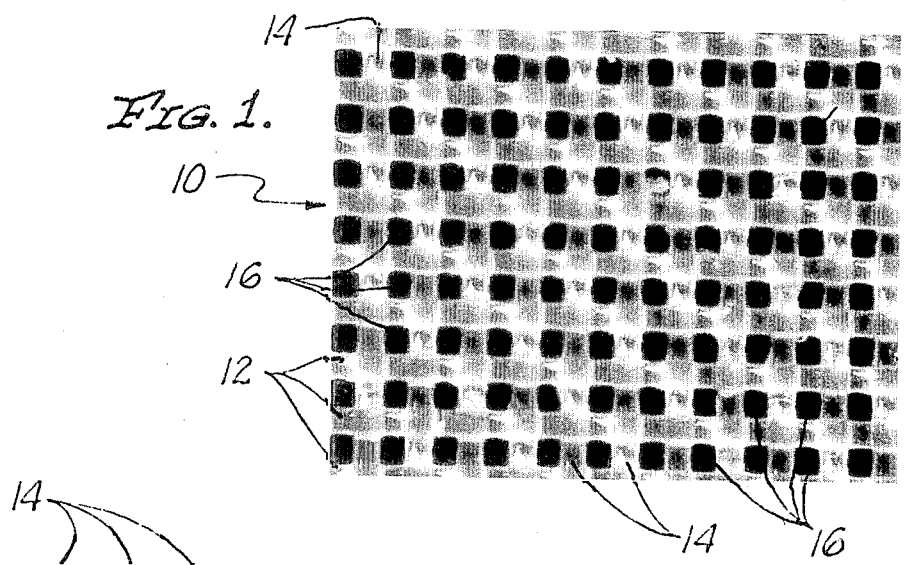
FIG. 1 is a photograph showing a commercial polyester fabric useful as a filter screen prior to treatment in accordance with this invention.

Because the accompanying drawing is primarily intended for use in explaining this invention none of the items illustrated in the drawing are to be considered as limiting the present invention in any regard. The scope of the present invention is considered as being set forth and defined in the appended claims forming a part of this disclosure.

DETAILED DESCRIPTION OF THE INVENTION

In FIG. 1 of the drawing there is shown an enlargement of a small piece (not separately numbered) of a woven fabric 10 mesh which is useful as a filter media. This fabric is composed of strands 12 and other spaced parallel strands 14 of the same or a different material. As will be apparent in FIG. 1 these strands 12 and 14 are woven together in accordance with conventional practice so that they overlie one another so as to define more or less square shaped opening 16 extending through the fabric 10 where they cross. Although it is not considered necessary to normally utilize such terminology from the textile industry in connection with this invention, if desired the strands 12 and 14 may be referred to as "warp" and "woof" strands.

The illustration of a woven fabric 10 is not to be taken as a limitation indicating the present invention in only useful with woven fabric. The present invention is also useful in connection with knitted fabrics (not shown) in which the individual strands of material (not shown) overlie one another where loops and "knots" are employed so as to hold the strands together into the fabric. Such knitted structures have openings between the strands roughly corresponding to the opening 16 described in the preceding but which differ from these openings 16 as to their configuration.

In accordance with this invention the material in various strands 12 or 14 in the fabric 10 (or other fabric used with the invention) should be a polymer material such as is commonly employed in the textile industry. These strands 12 or 14 may be either so-called monofilaments or may be twisted threads of the same or different polymers. If desired, reinforcing strands such as wire cores separated by polymer material may be used with the strands 12 or 14. Preferably they will have been stretched so that the polymer material within then is oriented so as to develop desirable strength characteristics prior to their being used in the fabric 10. Suitable results can be achieved if the strands 12 and 14 are of a conventional commercial polyester such as is used at present in filter cloths and in many other types of fabric. Suitable results can also be achieved when the material in the strands 12 and 14 is of a conventional commercial grade of a Nylon polymer such as is commonly used in filter material, in fabrics and the like.

Figure 3:
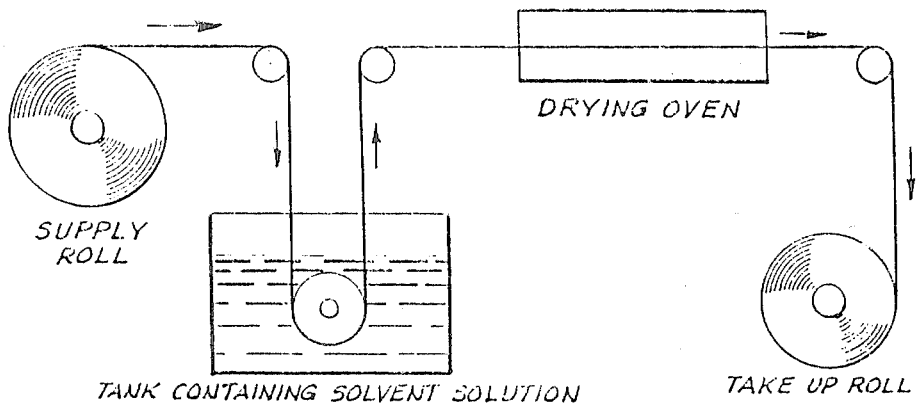
FIG. 3 is a diagrammatic view indicating the steps of the present invention.

In practicing the process fabric such as the fabric 10 is preferably treated as indicated in FIG. 3 of the drawing so as to contact all of the surfaces (not separately numbered) within the fabric 10 with a miscible mixture which will normally include two separate ingredients or classes of ingredients: (1) a solvent for the polymer or polymers in the fabric 10 or a miscible mixture of such solvents; and (2) a liquid which is miscible with such solvent or solvent mixture and which is not a solvent for the polymer or polymers in the fabric or a mixture of such liquids which is more volatile than the solvent or solvents. This mixture may be referred to as a "solvent-non solvent" mixture. Any solvent or non solvent used may be capable of chemically reacting with the polymer in the fabric 10 so long as the reaction is not detrimental to the polymer.

It will be recognized that a solvent for a specific polymer may or may not be a solvent for another polymer. Because of this it is considered impractical to attempt to list all solvents which can be used in practicing this invention. As an aid to understanding the invention it is noted that solvents such as phenol, tributyl ketone, diethyl ketone and benzene are solvents capable of being used with polymers containing aromatic groups in a polymer chain.

The solvent for the polymer may be chlorosulfonic acid or a known sulfur trioxide solvent complex. The use of this acid is desirable because of its availability and because of its ability to dissolve many polymers as previously discussed so as to create solutions which form menisci resulting in surfaces as described in this document. Because of the fact that this acid is relatively reactive when it is used as described in this discussion it will normally react with polymer material present so as to provide sulfonate groups on the polymer material. In some applications this can be desirable.

A number of non-solvents are for the material in the fabric, of course, well known. Particularly suitable results will be achieved utilizing alkanes which are liquid at normal ambient temperatures such as hexane. Depending upon the polymer or polymers in the fabric 10 suitable non solvents for use with the invention may be heptane, toluene, xylene and the like. Suitable results can also be achieved utilizing various different perhalohydrocarbons. Particularly suitable results can be achieved utilizing various different perflourohydrocarbons such as are commonly referred to utilizing the trademark Freon.

In order to obtain a preferred "action" as hereinafter indicated the non-solvent liquid used should be more volatile than the solvent used. It should be noted in connection with various non-solvents that a compound which is a non-solvent for one polymer may be a solvent for another. Although it is not preferred, it is possible to use as a non-solvent for a polymer a composition which will dissolve or swell the polymer to a very slight extent.

The contact between the fabric 10 and the liquid solvent-non solvent mixture should be sufficient so that the fabric 10 is completely wetted by this liquid mixture and so that the surfaces of the strands 12 and 14 are penetrated by the liquid mixture to at least sufficiently so that the polymer or polymers in the fabric 10 will be dissolved after dining to such an extent that the surface tension of the meniscus of the dissolved polymer material will result in the solution of the dissolved polymers flowing to create a continuous, smooth, curved surface extending between and connecting adjacent strands such as the strands 12 and 14. Such a curved surface may be considered a a series of such surfaces extending throughout the fabric 10.

Although the desired contact between the solvent-non-solvent mixture and the fabric 10 may be achieved by spraying such a mixture at a normal ambient temperature onto the fabric also having a normal ambient temperature sufficiently so as to "activate" the surfaces if the strands 12 and 14 as previously noted, it is considered preferable to contact the fabric 10 with such a mixture by immersing it in the mixture. The time of such immersion, the concentration of the solvent in the solvent-non-solvent mixture, the temperature of the mixture should be "coordinated" with the subsequent drying step employed with the process so that at the temperature of the gas (normally air) used to dry the wetted fabric and under the gas circulation conditions employed a meniscus as previously described forms, resulting in the flow of the polymer material as indicated in the preceding discussion.

The contact of the fabric 10 with the solvent-non-solvent mixture and the subsequent drying should be limited as to time and temperature employed so as to not noticeably cause any significant detrimental effect on the physical properties of the fabric 10 taken as a whole. It is believed that normally no more than about 50 percent of the weight of the polymer material should be placed in solution during the time of contact between the solvent-non-solvent mixture and the polymer during the contact and drying steps so as to minimize the chances of the fabric being detrimentally affected. For the same reason it is currently preferred that no more than about 20 percent of the weight of the polymer material be placed in solution to avoid any possibility of a significant decrease in the properties of the fabric.

From this it will be apparent that at least 50 percent of the weight of the fabric treated as herein described should be substantially unchanged as a result of the treatment specified and that the remainder will consist of polymer which has been placed in solution. Preferably at least 80 percent of the weight of the fabric will consist of the polymer material in substantially its original form and the remainder will be material which has been in solution. This may be significant in a particular application since frequently the original fibers in the fabric will be stretched to improve their physical strength. Normally the material which has been placed in solution and which has physically moved will differ from the "base" or original fibers from a physical standpoint.

Figure 2:
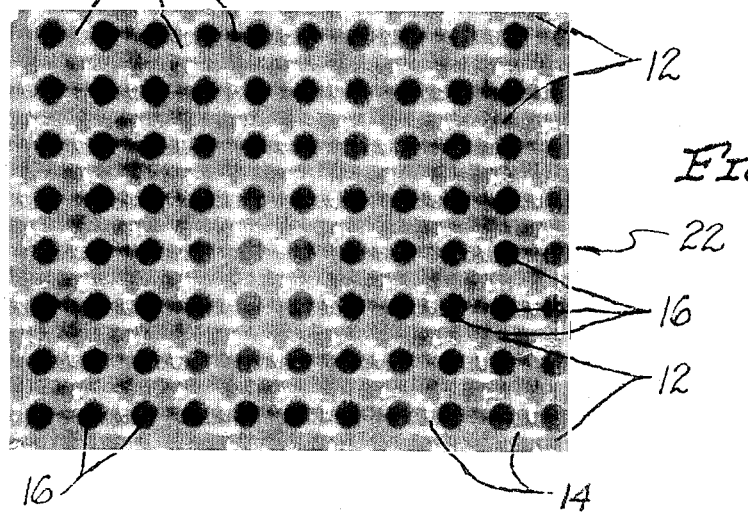
FIG. 2 is a similar view of the same type of fabric screen after treatment in accordance with this invention.

The treatment indicated will, in effect, convert the fabric 10 so that the strands 12 and 14 retain relative positions as in the original fabric and seem to blend into a lattice-like network 22 as indicated in FIG. 2 in which the former square openings 16 are arranged to essentially continuous, round openings defined by smooth, curved walls (not separately numbered). A corresponding transformation will be achieved with a knitted or similar fabric. The degree to which openings in a fabric will be altered will vary in accordance with the contact between the solvent-non-solvent mixture employed and the conditions of the drying step.

The fabric 10 may be conveniently accomplished by draining the solvent-non-solvent mixture from the fabric and then heating the fabric 10, so as to remove any residual liquid from the fabric 10. During heating care must be taken not to heat the fabric 10 at a temperature and for a time such that the physical structure of the treated fabric 10 will be altered. As a practical matter, the heating should be carried out no longer than is necessary to remove any residual of both the solvent and the non-solvent at a temperature only slightly above that which is necessary to accomplish such removal. As a consequence of this both the solvent and the non-solvent should have a boiling point below a temperature at which the polymer material or material present will tend to soften. With commonly used polymers, solvents and non-solvents, temperatures of from about 50° C. to about 100° C. can normally be employed.

As the heating of the wetted fabric 10 continues there will be a gradual increase in concentration of the solvent-non-solvent mixture remaining on the fabric due to the vaporization of the non-solvent. As the drying occurs the solvent-non-solvent mixture will also tend to "retreat" into small pores, cornices and crevices within the fabric 10. These actions will be accompanied by the polymer material increasingly passing into solution in the gradually decreasing amount of the solvent present on and in the fabric 10. The polymer solution formed will move or flow so as to relocate the dissolved polymer as a result of surface tension to create a continuous, smooth walled, curved surface as previously described after all the solvent has been vaporized. By this time the non-solvent will, of course, have been vaporized. As the treatment noted is carried out, a reactive solvent such as chlorosulfonic acid will concurrently react so as to provide sulfonate groups on the polymer material—in particular on the aromatic rings within the polymer material. This acid will continue to react until such time as all of it has been reacted or vaporized.

Generally speaking, the longer the contact between the liquid mixture and the longer the drying period, the greater the amount of polymer material placed in solution and the smaller the diameters of the holes or openings 16. As a consequence of this, it is possible to use this present invention in such a manner as to precisely regulate sizes of the holes or openings such as the holes 16 through a fabric 10. This can be quite desirable when the fabric 10 is to be used in applications where the dimensions of the openings through it are critical as for example, in the function of screens having precisely sized openings. If the contact with the polymer material is carried out for an undesirably long period the openings 16 may tend to completely close off. The time required for this to happen will be dependent on the initial fabric structure. Of course this is undesirable in connection with a filter or similar screen.

Because of the fact that the invention is essentially or primarily of a "physical" character and the fact that it is useful in treating fabrics or equivalent structures of a wide variety of diverse polymers with a wide variety of mixtures of solvents and non-solvents, it is considered that it is not necessary to set forth so-called "examples" as to how to practice the invention. Anyone reasonably familiar with polymer chemistry should have no difficulty in selecting a suitable solvent and a suitable non-solvent for use with the particular polymer fabric on the basis of the usual skill in the field through the use of routine testing. Such routine experimentation will usually be employed to determine the precise treatment conditions desired in any particular circumstance.

Nevertheless, it is considered that a discussion relative to the concentration of a solvent-non-solvent mixture preferably used in practicing the invention and a discussion of the use of such a mixture will be of benefit in aiding anyone skilled in the art or in the field of this invention in practicing this invention.

In treating common Dacron, Nylon and similar commercially available knitted and woven fabrics, as well as fabrics of many other commonly available polymers it is considered that the total weight of the polymer solvent in the solvent-non-solvent mixture should normally be within the range of from about 0.1% to about 25% by weight of the weight of the total solvent-non-solvent mixture. It is normally considered that it will be preferable to utilize a solvent such as chlorosulfonic acid or a known sulfurtrioxide complex. When such a highly effective polymer solvent is used it is considered that it should be used in an amount of from about 0.2 to about 2% by weight of the weight of the solvent-non-solvent solution.

Generally speaking, it is satisfactory in practicing the invention to contact the fabric with the solvent-non-solvent solution for a time period which is sufficient at the temperature of the mixture and the fabric for the fabric to be wetted to a sufficient extent so that a desired product will be obtained. Because of the variation in the ways a fabric may be contacted with a liquid by spraying techniques it is not considered practical to specify the time that a solvent-non-solvent mixture should be sprayed on a fabric in practicing this invention. When such a mixture is to be brought into contact with fabric by immersion as indicated in FIG. 3 of the drawing and both the fabric and the mixture are at an normal ambient temperature it is considered that satisfactory results can be achieved if the fabric is immersed in the mixture from a period of about 1 second to about two minutes when the concentration of the mixture is within the broad range indicated herein. When a highly effective solvent such as chlorosulfonic acid is employed in a mixture having a more restricted concentration as previously specified it is considered that satisfactory results will normally be obtained if the fabric is immersed in the mixture for a time period of from about 10 to about 100 seconds.

Both of the time periods indicated in the preceding are based on the assumption that the subsequent drying step is carried out at a temperature as previously indicated within the range from about 50° to about 100° C. in hot air or other gas for a period which is no longer than is necessary to remove substantially all of the solvent and the nonsolvent form the solvent-nonsolvent mixture from the fabric. The time required will, to a degree, depend upon the physical structure of the fabric and the strands within it.

When a reactive solvent such as chlorosulfonic acid or a sulfurtrioxide complex is used there will be a reaction with the polymer or polymers within the fabric 10 as the process is practiced. This will result in sulfonic acid groups being placed on any polymer material present. Normally these groups will be primarily located on or adjacent to the surfaces of the polymer material which have been contacted by the solvent-non-solvent mixture. This will serve to make at least the surface of a final fabric product hydrophillic in character.

If desired, the process conditions can be varied by routine experimentation so that such sulfonation is carried out to an extent to produce a noticeable amount of polymer material which will either swell or become gel-like in water. Normally, the formation of such polymer material will not be a problem so long as the contact of the chlorosulfonic acid or other similar solvent is limited as indicated in the preceding discussion. In some applications however, a hydrophillic surface produced by the reaction of a solvent such as chlorosulfonic acid which will swell or become gel-like in character in water may be advantageous. Polymer material which has been reacted so as to swell or become gel-like in character in water can be removed from polymer material which will not swell or become gel-like in character in water by being placed in solution in a known manner.

I claim:

1. A polymer fabric mesh made of strands of synthetic material having openings defined by said strands in which the improvement comprises:
   said strands being further defined by a continuous, smooth, curved polymer layer extending between and connecting said strands, said polymer layer having been produced by (1) placing some of said polymer material in solution, (2) allowing said polymer solution to flow so as to cover, surround, extend between, and connect said strands and (3) drying said polymer solution so as to produce said layer.

2. A polymer fabric mesh as claimed in claim 1 wherein:
   said strands are of a polyamide polymer.

3. A polymer fabric mesh as claimed in claim 1 wherein: said strands are of a polyester polymer.

4. A polymer fabric mesh as claimed in claim 1 wherein:
   no more than about 50% by weight of said fabric mesh differs from the remainder of said fabric mesh as a result of having been placed in solution.

5. A polymer fabric mesh as claimed in claim 4 wherein:
   no more than about 20% by weight of said fabric mesh differs from the remainder of said fabric mesh.

6. A fabric mesh as claimed in claim 1 wherein:
   said fabric mesh is a woven fabric in which said openings are openings between adjacent strands, and the openings are of a generally circular configuration.

7. A polymer fabric mesh as claimed in claim 6 wherein:
   said strands are polyamide polymer strands.

8. A polymer fabric mesh as claimed in claim 6 wherein:
   said strands are of a polyester polymer material.

9. A fabric mesh as claimed in claim 1 wherein:
   said fabric mesh is a knitted fabric.

10. A polymer fabric mesh as claimed in claim 9 wherein:
no more than about 50% by weight of said fabric mesh differs from the remainder of said fabric mesh as a result of having been placed in solution.

11. A polymer fabric mesh as claimed in claim 10 wherein:
no more than about 20% by weight of said fabric mesh differs from the remainder of said fabric mesh.

12. A polymer fabric mesh as claimed in claim 10 wherein:
said strands are polyamide polymer strands.

13. A polymer fabric mesh as claimed in claim 10 wherein:
said strands are of a polyester polymer material.

14. A fabric mesh as claimed in claim 1 wherein:
the exterior surfaces of said fabric mesh are hydrophilic as a result of the presence of sulfonic acid groups thereon.

15. A process in which overlying strands of synthetic polymer material in a fabric mesh are treated so as to be bonded together in which the improvement comprises:
said strands being strands of at least one polymer which is soluble in a solvent,
said strands are treated by (a) applying a mixture of (1) said solvent for the polymer and (2) another liquid which is not a solvent for the polymer and which is more volatile than said solvent to the strands and (b) then drying said strands to remove said solvent and said other liquid by evaporation,
the time when said strands are in contact with said mixture and the temperature of said mixture together with the drying time and temperature being sufficient to dissolve polymer material within said strands to as sufficient extend so that the surface tension of the dissolved polymer will cause the dissolved polymer to move to create after said drying a continuous, smooth walled, curved surface connecting adjacent strands and extending between such strands.

16. A process as claimed in claim 15 wherein:
said overlying strands are parallel, spaced strands in a woven fabric located so as to define squarish holes located generally between said strands, and
said solvent solution is applied to a sufficient extent so as to create roundish holes which take the place of the original holes between said strands as a result of some of said polymer material going into solution and surface tension acting on the dissolved polymer material.

17. A process as claimed in claim 16 wherein:
said solvent is chlorosulfonic acid, and
said chlorosulfonic acid reacts with said polymer material so as to result in the presence of sulfonic groups along the surfaces of said fabric.

18. A process as claimed in claim 16 wherein:
said mixture contains from about 0.1 to about 20% by weight of said other liquid and is applied to said fabric for a period of from about 1 second to about 2 minutes at normal ambient temperature, and
said fabric is air dried at a temperature of from about 50° to about 100° C.

19. A process as claimed in claim 16 wherein:
said solvent is chlorosulfonic acid,
said mixture contains of from about 0.2 to about 2% by weight of chlorosulfonic acid and is applied to said fabric for a period of from about 10 seconds to about 100 seconds at a normal ambient temperature, and
said fabric is air dried at a temperature of from about 50° to about 100° C.

20. A process as claimed in claim 15 wherein:
said fabric is a knitted fabric and said solvent mixture is applied for a time period and at a temperature sufficient so as to cause a change in the shape of the holes between said strands.

21. A process as claimed in claim 20 wherein:
said mixture contains from about 0.1 to about 20% by weight of said other liquid and is applied to said fabric for a period of from about 1 second to about 2 minutes at normal ambient temperature, and
said fabric is air dried at a temperature of from about 50° to about 100° C.

22. A process as claimed in claim 20 wherein:
said solvent is chlorosulfonic acid,
said mixture contains of from about 0.2 to about 2% by weight of chlorosulfonic acid and is applied to said fabric for a period of from about 10 seconds to about 100 seconds at a normal ambient temperature, and
said fabric is air dried at a temperature of from about 50° to about 100° C.

23. A process as claimed in claim 20 wherein:
said solvent is chlorosulfonic acid, and
said chlorosulfonic acid reacts with said polymer material so as to result in the presence of sulfonic groups along the surfaces of said fabric.

* * * * *